United States Patent
Lui et al.

(10) Patent No.: US 7,157,180 B2
(45) Date of Patent: Jan. 2, 2007

(54) RECHARGEABLE BATTERY PACK

(75) Inventors: Tat Nin Lui, Aberdeen (HK); Kwok Kwong Ho, Hong Kong (HK); Heung Ching Ng, Kowloon (HK)

(73) Assignee: Choon Nang Electrical Appliance Mfy., Ltd., Aberdeen (HK)

( * ) Notice: Subject to any disclaimer, the term of this patent is extended or adjusted under 35 U.S.C. 154(b) by 625 days.

(21) Appl. No.: 10/621,333

(22) Filed: Jul. 18, 2003

(65) Prior Publication Data

US 2004/0029426 A1  Feb. 12, 2004

(30) Foreign Application Priority Data

Aug. 12, 2002  (GB)  ................. 0218736.7

(51) Int. Cl.
*H01M 2/10* (2006.01)
*H01M 10/50* (2006.01)

(52) U.S. Cl. .................. 429/100; 429/96; 429/97; 429/99

(58) Field of Classification Search ............. None
See application file for complete search history.

(56) References Cited

U.S. PATENT DOCUMENTS

| 5,368,954 | A | | 11/1994 | Bruns |
| 5,697,070 | A | * | 12/1997 | Liebler ..................... 455/575.1 |
| 6,181,032 | B1 | * | 1/2001 | Marshall et al. ............ 307/150 |
| 6,566,005 | B1 | * | 5/2003 | Shimma et al. ............. 429/148 |
| 2004/0081883 | A1 | * | 4/2004 | Mooty et al. ................. 429/96 |

FOREIGN PATENT DOCUMENTS

EP   1 075 906   2/2001

* cited by examiner

*Primary Examiner*—John S. Maples
(74) *Attorney, Agent, or Firm*—Leydig, Voit & Mayer, Ltd.

(57) ABSTRACT

A battery pack for a power tool includes a casing housing rechargeable cells. A receiving bay in the casing receives slide-in parts of the power tool and of a recharging stand, to retain the battery pack. A pair of primary electrical contacts is located in or adjacent the receiving bay. A recess opens into the receiving bay. A supplementary electrical contact is located within the recess, and a user-manipulable catch is also located in the recess alongside the supplementary contact. That is, a single recess houses both the supplementary contact and the mechanical catch. The supplementary contact is usable when recharging the battery to relay battery temperature information to a recharging stand, but has no function when the battery pack is attached to the power tool. The catch, useful in retaining the battery pack on the power tool, has no function with the recharging stand.

14 Claims, 7 Drawing Sheets

RECHARGEABLE BATTERY PACK

The present invention relates to a rechargeable battery pack that is detachable from a power tool such as a drill, for connection to a recharging stand.

BACKGROUND OF THE INVENTION

The invention relates more particularly to a rechargeable battery pack having a supplementary electrical contact to engage with a contact on the recharging stand, and with which a mechanical locking device, by which the battery pack can be engaged securely with the power tool, is associated.

Rechargeable power tools are known. For example, rechargeable drills can have rechargeable batteries incorporated permanently therein, or can have removable battery packs. Power tools having removable battery packs are more versatile because several battery packs can be pre-charged for stand-by interchangeability during use of the power tool. That is, the tool needs not remain idle when its batteries are being recharged.

Power tools such as drills having replaceable battery packs, have various means of inter-engagement between the tool (usually at the base of the handle) and the battery pack. Such means serve not only to secure the components together mechanically, but also to provide proper electrical contact. When the battery pack is removed, it can be recharged. This can be achieved by attaching a wire from a mains-powered step-down transformer to the battery pack, or by mounting the battery pack itself on a recharging stand within which a step-down transformer is housed.

Many recharging stands have been proposed for this purpose. Some battery pack/recharging stand combinations have separate means of electrical and mechanical inter-engagement. Others have combined electrical/mechanical inter-engagement structures, but these can be more complicate in design and usability than might be desirable. For example, although a desirable feature is to securely lock the battery pack in place upon the power tool, it is not necessarily convenient to lock the battery pack securely in place upon the recharging stand.

OBJECT OF THE INVENTION

It is an object of the present invention to overcome or substantially ameliorate at least one of the above disadvantages and/or more generally to provide an improved battery pack for a power tool.

It is a further object of the present invention to provide an improved combination of a battery pack, power tool and recharging stand, having improved electrical and mechanical inter-engagement between the battery pack and the power tool on the one hand, and improved electrical contact between the battery pack and the recharging stand on the other.

SUMMARY OF THE INVENTION

According to the invention, there is provided a battery pack for a power tool, comprising:

- a casing within which a rechargeable cell or cells is or are housed,
- a receiving bay formed in the casing and into which slide-in parts of the power tool, or of a recharging stand can be received to thereby retain the battery pack,
- a pair of primary electrical contacts in or adjacent to the receiving bay and electrically associated with the rechargeable cell or cells,
- a recess that opens into the receiving bay,
- a supplementary electrical contact located within the recess, and
- a user-manipulable catch located within the recess alongside the supplementary electrical contact.

Preferably, the catch co-operates with the power tool, but not with the recharging stand.

Preferably, the supplementary electrical contact cooperates with the recharging stand, but not with the power tool.

Put another way, preferably, the catch does not engage with the recharging stand, but the supplementary electrical contact does.

Similarly, put another way, preferably, when the battery pack is attached to the power tool, the catch secures the battery pack to the power tool mechanically, but the supplementary electrical contact does not make electrical contact with the power tool.

To complement the above, preferably, the recess provides a supplementary electrical contact between the battery pack and the power stand without the catch engaging therewith.

Preferably, the receiving bay includes rails to be received within tracks of the power tool or recharging stand.

Preferably, the user-manipulable catch includes a trigger accessible from the casing exterior.

Preferably, the catch includes at least one catch member for mechanical interaction with a co-operable part of a power tool.

Preferably, the primary electrical contacts and the supplementary electrical contact are elongate and parallel with one another.

More preferably, the supplementary electrical contact is located centrally between the primary electrical contacts.

It is preferred that the recess is located centrally between the primary electrical contacts.

It is preferred that the catch includes a pair of the catch members, and the supplementary electrical contact is located centrally between the two catch members.

Preferably, the battery pack includes a temperature sensor electrically associated with the supplementary electrical contact.

The invention also provides a combination of the battery pack, a power tool and a recharging stand. The power tool includes slide-in parts receivable into the receiving bay and a pair of electrical contacts for connection with the primary electrical contacts of the battery pack respectively. The recharging stand includes slide-in parts receivable into the receiving bay and a pair of primary and a supplementary electrical contacts for connection with the primary and supplementary electrical contacts of the battery pack respectively.

BRIEF DESCRIPTION OF THE DRAWINGS

A preferred embodiment of the present invention will now be described, by way of example only, with reference to the accompanying drawings, in which.

DETAILED DESCRIPTION OF PREFERRED EMBODIMENT

Figure 1:
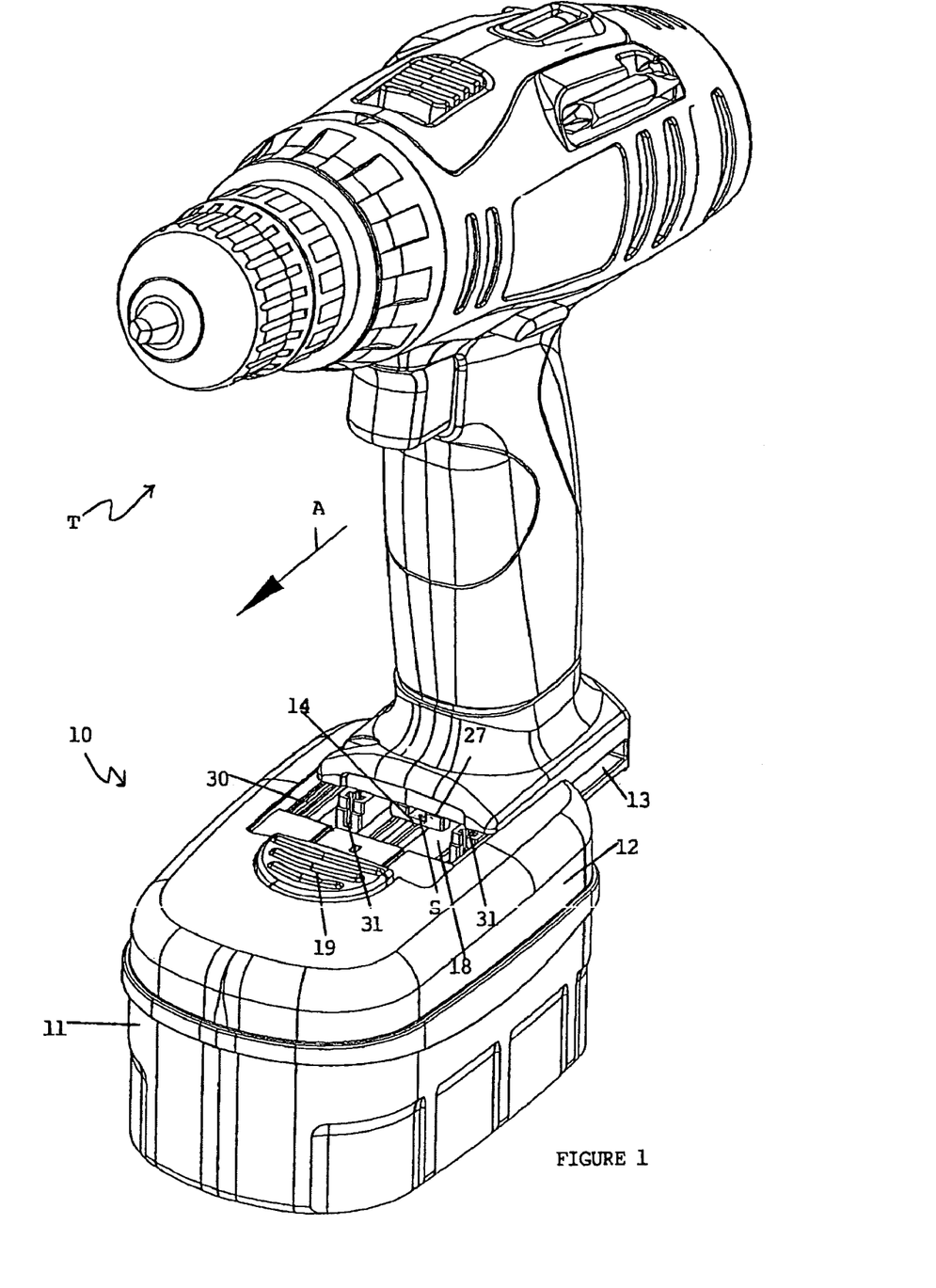
FIG. 1 is a perspective view of a power tool using an embodiment of a battery pack in accordance with the invention, partially engaged therewith.

Referring to the accompanying drawings, there is shown a power tool such as a drill T to which there is partially attached a battery pack 10 embodying the invention. The battery pack 10 includes a lower casing part 11 and an upper casing part 12 that are screwed or otherwise held together to form a casing within which a number of battery cells 24 (FIG. 3) are housed.

The upper casing 12 includes a receiving bay 18 having laterally opposed rails 30 that extend into corresponding laterally opposed tracks 13 formed in the bottom of the power drill T. The rails 30 and tracks 13 form a secure mechanical engagement between the battery pack 10 and the power drill T upon sliding inter-engagement in the direction indicated by arrow A.

Figure 4:
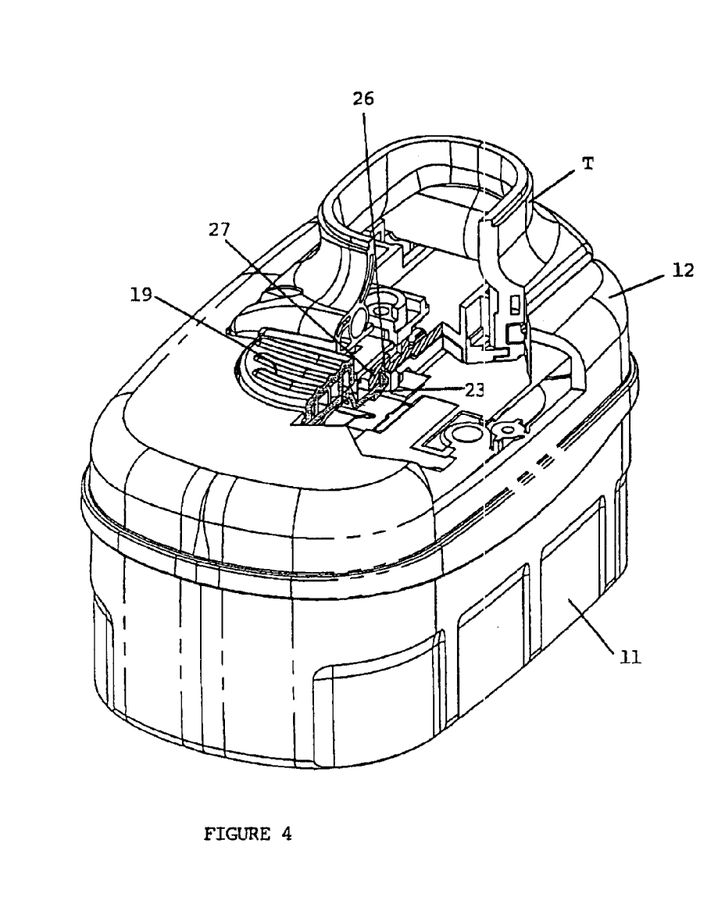
FIG. 4 is a partially cut-away perspective view of the battery pack fully engaged with the power tool of FIG. 1.
Figure 5:
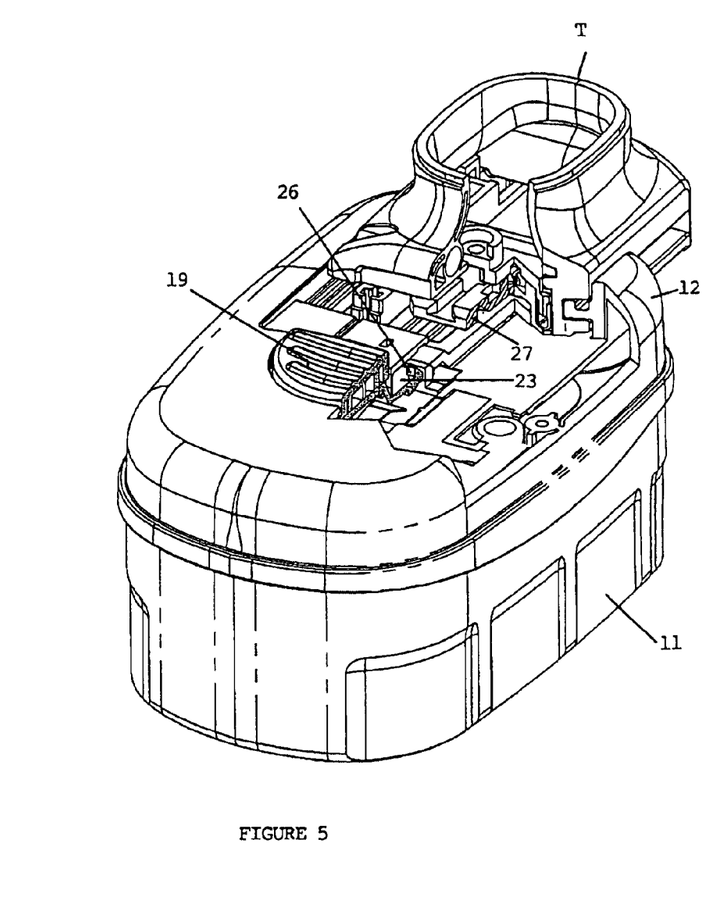
FIG. 5 is a partially cut-away perspective view of the battery pack partially engaged with the power tool of FIG. 1.

The power drill T includes, in its handle base, a tongue 14 that slides into a recess 15 of the receiving bay 18 upon full sliding engagement of the drill T and battery pack 10. The recess 15 opens into the receiving bay 18. A release trigger 19 is provided in the upper casing part 12. Formed integrally with the release trigger 19 is a retaining catch 23 having a pair of upstanding pawls 26. The retaining catch 23 resides within the recess 15 and engages with co-operable pawls 27 formed on the tongue 14 when the battery pack 10 is fully engaged with the power drill T. To this end, the pawls 26 and 27 are provided with mutually inter-engaging ramp surfaces as shown only upon depression of trigger 19 is it possible to detach the battery pack 10 from the power drill T. That is, depression of the trigger 19 causes downward movement of pawls 26, which thereby disengage from the corresponding pawls 27 of the power drill T.

Figure 3:
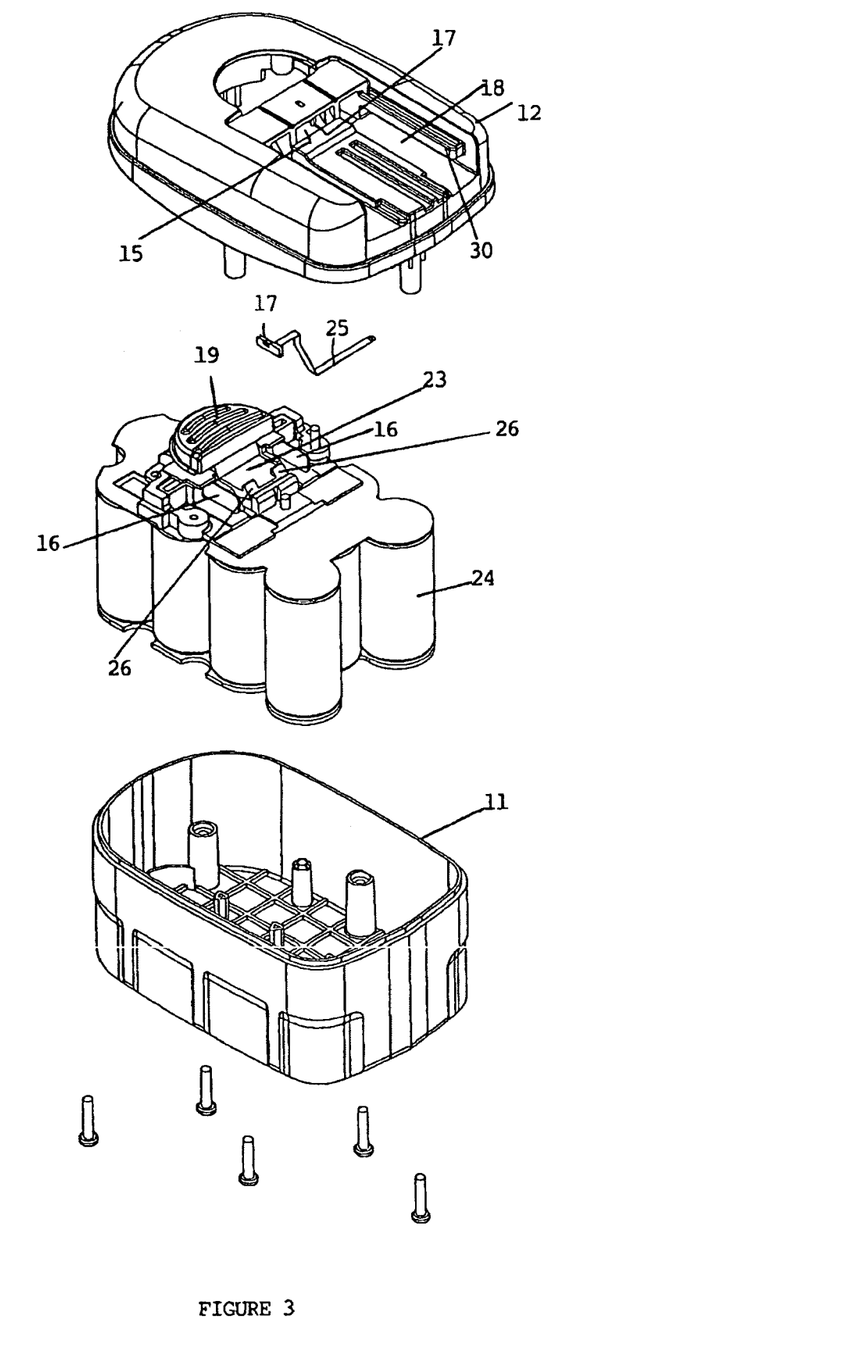
FIG. 3 is an exploded perspective view of the battery pack of FIG. 1.

A pair of primary electrical contacts 16, in the form of blades, is provided within or adjacent the receiving bay 18 of the battery pack 10 and located symmetrically on opposite sides of the recess 15. The primary electrical contacts 16 are in circuit with the rechargeable battery cells 24. Each primary contact 16 extends longitudinally in a direction parallel to the rails 30 such that upon sliding engagement of the battery pack 10 with the power drill T, they engage with spring clip-like electrical contacts located within terminals 31 of the power drill T.

Situated above the retaining catch 23 and within the recess 15, there is a supplementary electrical contact 17 in the form of another blade. The supplementary electrical contact 17 extends in a direction parallel to the primary electrical contacts 16, and is located centrally between the primary contacts 16 and also centrally between the two pawls 26 of the catch 23. Upon engagement of the battery pack 10 with the power drill T, the supplementary electrical contact 17 passes into the space S between the pawls 27 without making any electrical contact with the power drill T.

Extending from the supplementary electrical contact 17 is a conductor 25 leading to a temperature probe located alongside or amongst the rechargeable battery cells 24 to thereby sense the battery temperature.

Figure 2:
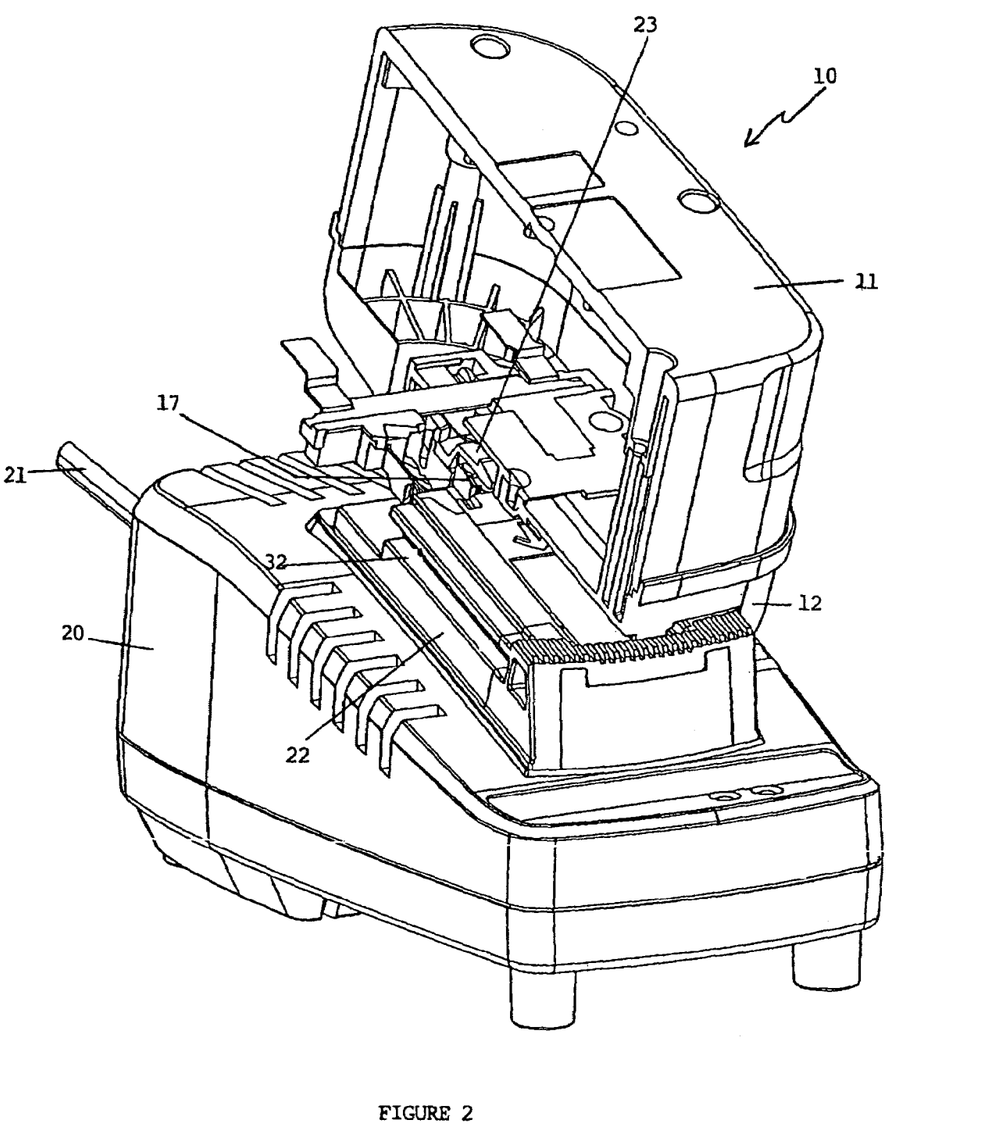
FIG. 2 is a partially cut-away perspective view of the battery pack of FIG. 1, engaged upon a recharging stand.
Figure 6:
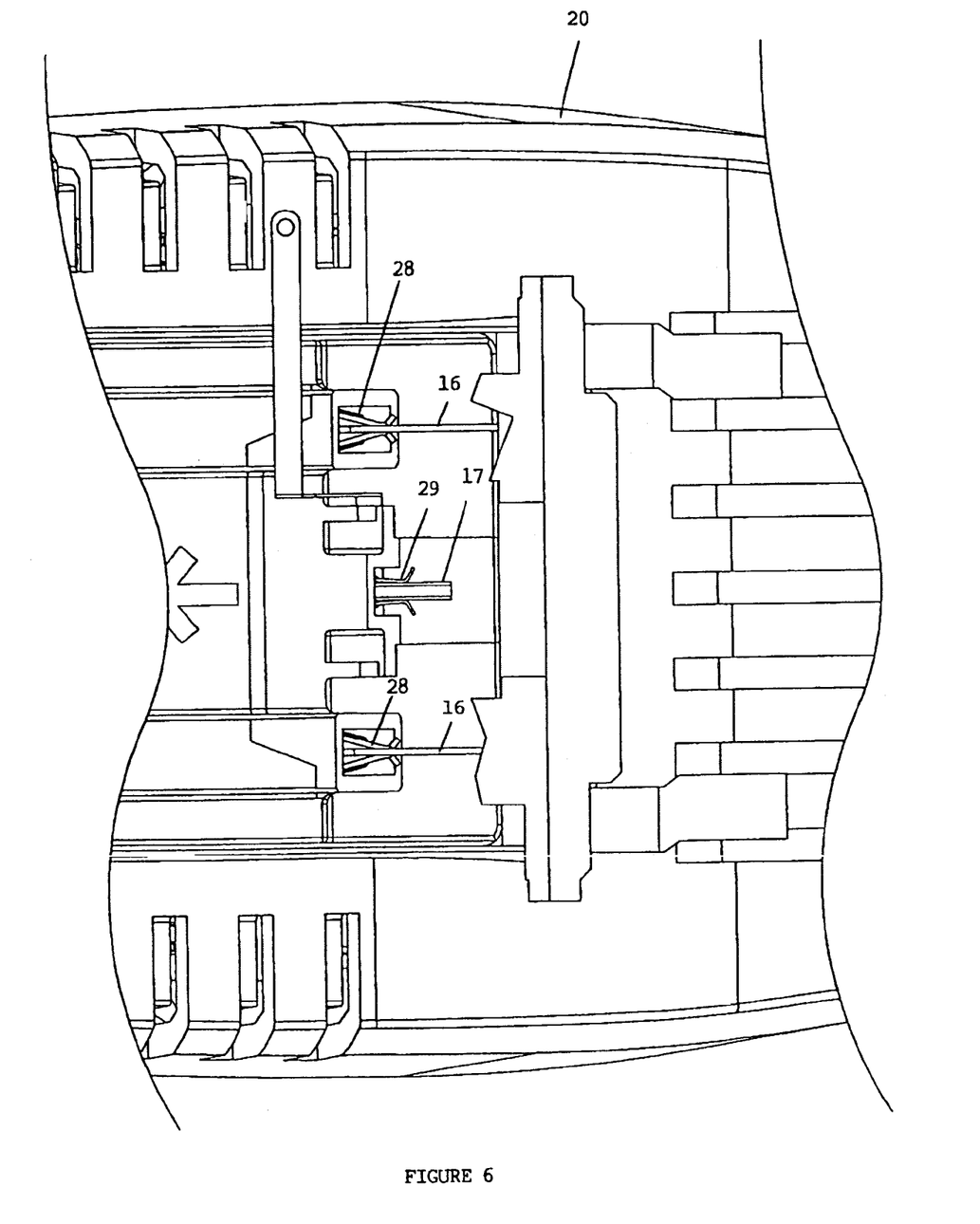
FIG. 6 is a close-up plan view showing inter-engaging components of the battery pack and the recharging stand of FIG. 2.
Figure 7:
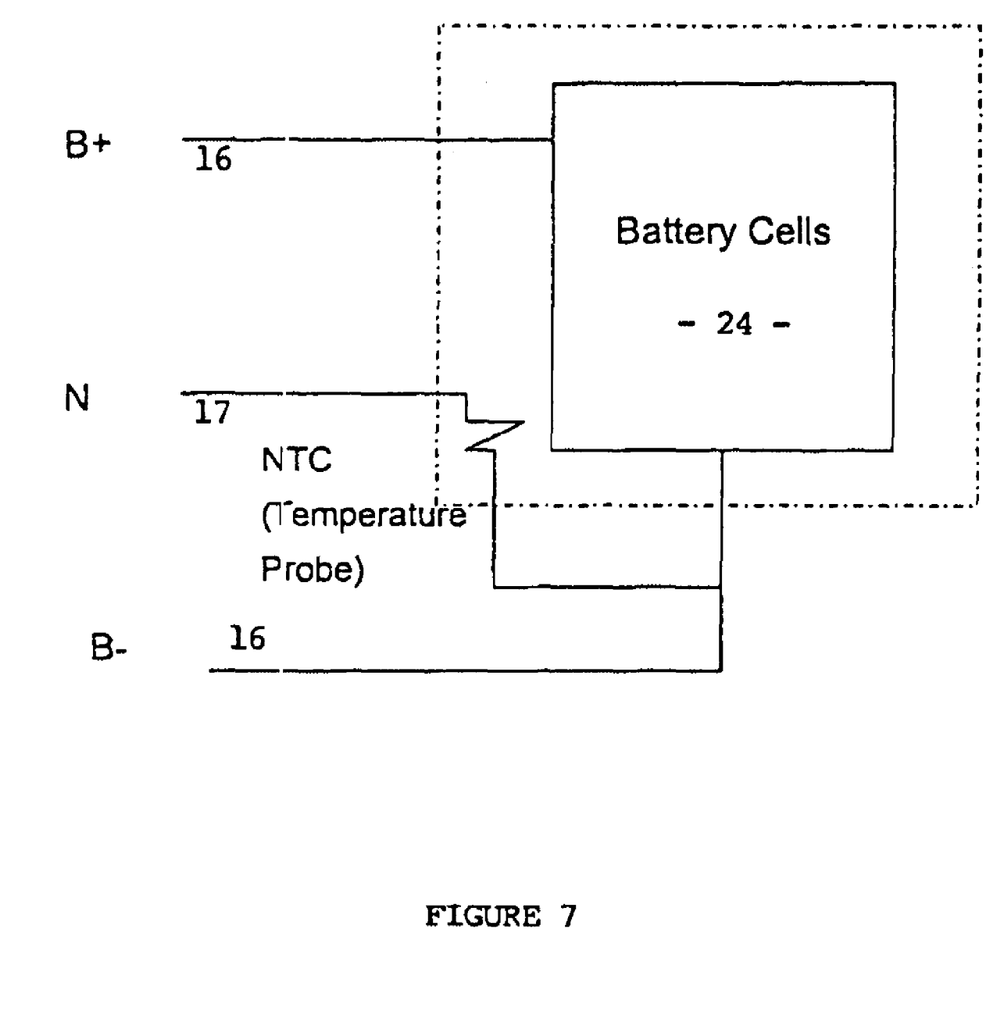
FIG. 7 is a schematic circuit diagram of the battery pack of FIG. 3.

A recharging stand 20 houses a step-down transformer receiving the mains power via an electrical cord 21. The recharging stand 20 includes a battery cradle 22. The cradle 22 is formed much like the components at the base of the power drill T, including a pair of opposed tracks 32 along which the rails 30 of the battery pack 10 ride. The recharging stand 20 includes a pair of spring clip-like primary terminals 28 into which the blade-like primary contacts 16 of the battery pack 10 are received for the purpose of conveying electrical current from the transformer located within the stand 20 to the rechargeable cells 24. Also provided is a supplementary spring clip-like terminal 29 with which the supplementary contact 17 engages.

Figure 8:
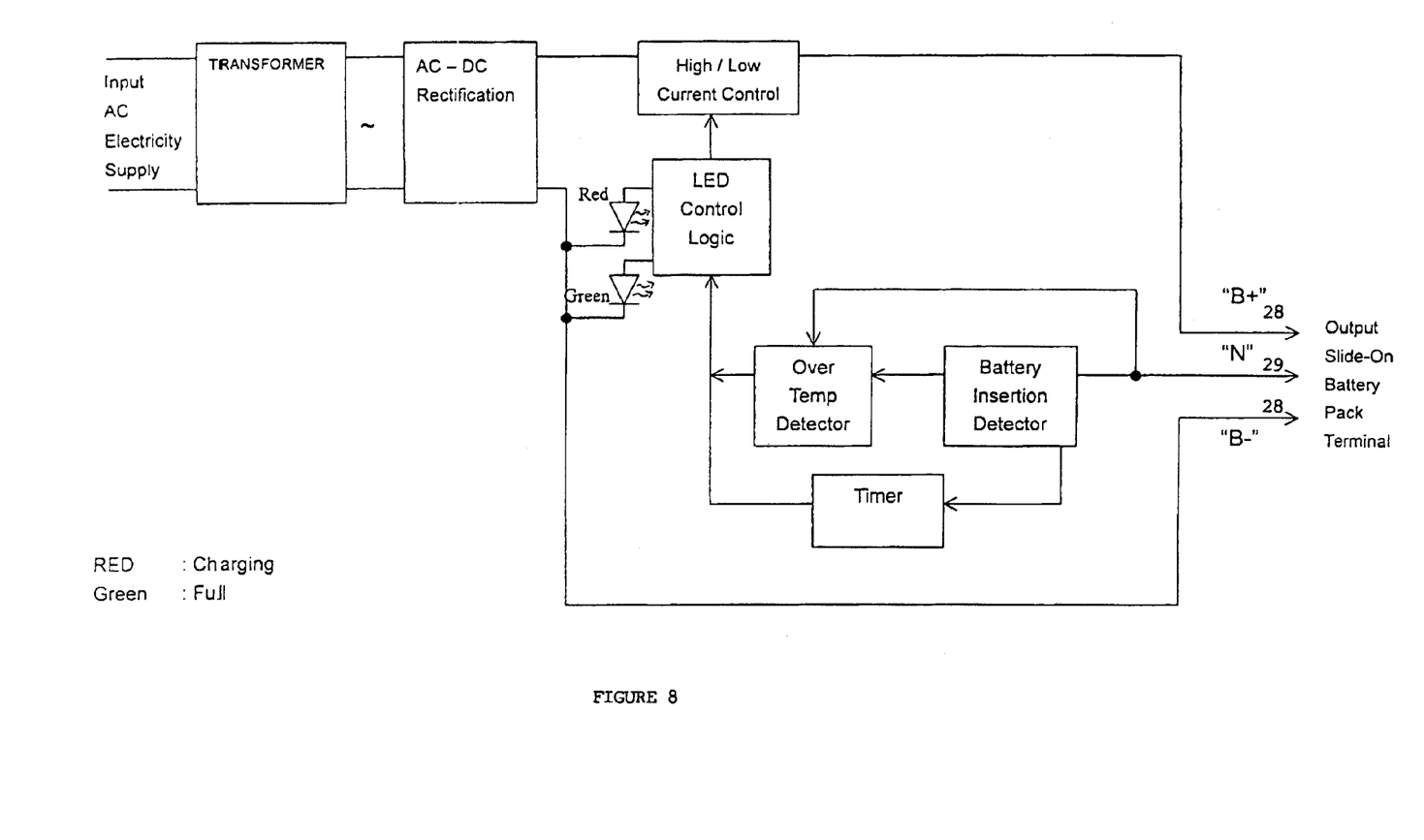
FIG. 8 is a schematic circuit diagram of the recharging stand of FIG. 2.

The terminal 29 relays temperature signals from the temperature probe to the circuitry of the battery stand 20 shown in FIG. 8. The circuitry includes a battery insertion detector and an over-temperature detector, an LED control circuit and related circuitry which upon detection of excessive battery temperature terminates recharging current to the terminals 28.

When the battery pack 10 is engaged upon the recharging stand 20, the retaining catch 23 and trigger 19 perform no function.

It should be appreciated that modifications and alterations obvious to those skilled in the art are not to be considered as beyond the scope of the present invention. For example, instead of a drill, the power tool T might be a hand-held sander, angle grinder or any other hand-held power tool.

The invention claimed is:

1. A battery pack for a power tool, comprising:
   a casing housing at least one rechargeable cell,
   a receiving bay in the casing for slidingly receiving and retaining in engagement with the battery pack, one at a time, a slide-in part of a power tool and a slide-in part of a recharging stand,
   a pair of primary electrical contacts in or adjacent to the receiving bay and electrically associated with the at least one rechargeable cell,
   a recess that opens into the receiving bay,
   a supplementary electrical contact located within the recess, and
   a user-manipulable catch located within the recess alongside the supplementary electrical contact.

2. A combination of the battery pack as claimed in claim 1, a power tool, and a recharging stand, wherein
   the power tool includes slide-in parts receivable in the receiving bay and electrical contacts for connection to respective primary electrical contacts of the battery pack, and
   the recharging stand includes slide-in parts receivable in the receiving bay and a pair of primary electrical contacts and a supplementary electrical contacts for respective connection to primary and supplementary electrical contacts of the battery pack.

3. The combination as claimed in claim 2, wherein the catch co-operates with the power tool, but not with the recharging stand.

4. The combination as claimed in claim 2, wherein the supplementary electrical contact of the battery pack co-operates with the recharging stand, but not with the power tool.

5. The combination as claimed in claim 2, wherein the catch does not engage the recharging stand, but the supplementary electrical contact of the battery pack makes contact with the recharging stand.

6. The combination as claimed in claim 2, wherein, when the battery pack is attached to the power tool, the catch secures the battery pack to the power tool mechanically, but the supplementary electrical contact does not make electrical contact with the power tool.

7. The combination as claimed in claim 2, wherein the receiving bay includes rails received within tracks of one of the power tool and the recharging stand.

8. The battery pack as claimed in claim 1, wherein the user-manipulable catch includes a trigger accessible from outside the casing.

9. The battery pack as claimed in claim 1, wherein the catch includes at least one catch member for mechanical interaction with a co-operable part of a power tool.

10. The battery pack as claimed in claim 1, wherein the primary electrical contacts and the supplementary electrical contact are elongate and parallel to one another.

11. The battery pack as claimed in claim 10, wherein the supplementary electrical contact is located centrally between the primary electrical contacts.

12. The battery pack as claimed in claim 1, wherein the recess is located centrally between the primary electrical contacts.

13. The battery pack as claimed in claim 9, wherein the catch includes a pair of the catch members, and the supplementary electrical contact is located centrally between the two catch members.

14. The battery pack as claimed in claim 1, including a temperature sensor electrically associated with the supplementary electrical contact.

* * * * *